United States Patent
Godfrey

(10) Patent No.: US 11,796,353 B2
(45) Date of Patent: Oct. 24, 2023

(54) CABLE FOR DISTRIBUTED SENSING

(71) Applicant: OPTASENSE HOLDINGS LIMITED, Farnborough (GB)

(72) Inventor: Alastair Godfrey, Farnborough (GB)

(73) Assignee: Optasense Holdings Limited, Farnborough (GB)

( * ) Notice: Subject to any disclaimer, the term of this patent is extended or adjusted under 35 U.S.C. 154(b) by 490 days.

(21) Appl. No.: 16/482,176

(22) PCT Filed: Jan. 30, 2018

(86) PCT No.: PCT/GB2018/050250
§ 371 (c)(1),
(2) Date: Jul. 30, 2019

(87) PCT Pub. No.: WO2018/142113
PCT Pub. Date: Aug. 9, 2018

(65) Prior Publication Data
US 2020/0056907 A1  Feb. 20, 2020

(30) Foreign Application Priority Data
Jan. 31, 2017 (GB) ..................... 1701595

(51) Int. Cl.
*G02B 6/44* (2006.01)
*G01D 5/353* (2006.01)

(52) U.S. Cl.
CPC .......... *G01D 5/3538* (2013.01); *G02B 6/443* (2013.01); *G02B 6/4415* (2013.01)

(58) Field of Classification Search
CPC .......... G01D 5/3538; G01D 5/35377; G02B 6/4415; G02B 6/443; G02B 6/4432; G02B 6/4433

(Continued)

(56) References Cited

U.S. PATENT DOCUMENTS 4,730,894 A * 3/1988 Arroyo ................ G02B 6/4411
                                                           385/111
5,384,880 A * 1/1995 Keller ................. G02B 6/4403
                                                           385/100

(Continued)

FOREIGN PATENT DOCUMENTS

GB  2 188 719  10/1987
GB  2 442 745   4/2008

(Continued)

OTHER PUBLICATIONS

European Patent Office, Examination Report, dated Jun. 15, 2020, issued in connection with European Patent Application No. 18703815.3, 6 pages.

*Primary Examiner* — Kaveh C Kianni
*Assistant Examiner* — Hung Q Lam
(74) *Attorney, Agent, or Firm* — McDonnell Boehnen Hulbert & Berghoff LLP

(57) ABSTRACT

This application relates to a fibre optic cable (104, 300) suitable for use with a distributed fibre optic sensor apparatus (106). The fibre optic cable includes at least one optical fibre (301) and a force transformer (304) mechanically coupled to the at least one optical fibre. The cable may also include at least one cladding later (302) and/or a compliant material (303). The cable may be surrounded by a jacket layer (306). The force transformer (304) is configured to transform transverse forces due to dimension changes of the cable arising from a temperature variation of the cable into longitudinal forces to counteract the longitudinal component of said dimension change over a tuned temperature range. In this way optical path length changes due to a change of temperature can be reduced or eliminated providing a cable which is insensitive to temperature.

19 Claims, 5 Drawing Sheets

(58) Field of Classification Search
USPC .......................... 385/102, 105–111, 113, 13
See application file for complete search history.

(56) References Cited

U.S. PATENT DOCUMENTS

| | | | | |
|---|---|---|---|---|
| 6,122,427 A | * | 9/2000 | Yokokawa | G02B 6/4408 |
| | | | | 385/113 |
| 2016/0220131 A1 | * | 8/2016 | Kishida | A61B 5/7278 |

FOREIGN PATENT DOCUMENTS

| | | |
|---|---|---|
| WO | WO 00/03217 | 1/2000 |
| WO | WO 2012/137021 | 10/2012 |
| WO | WO 2012/137022 | 10/2012 |
| WO | WO 2016/055787 | 4/2016 |

\* cited by examiner

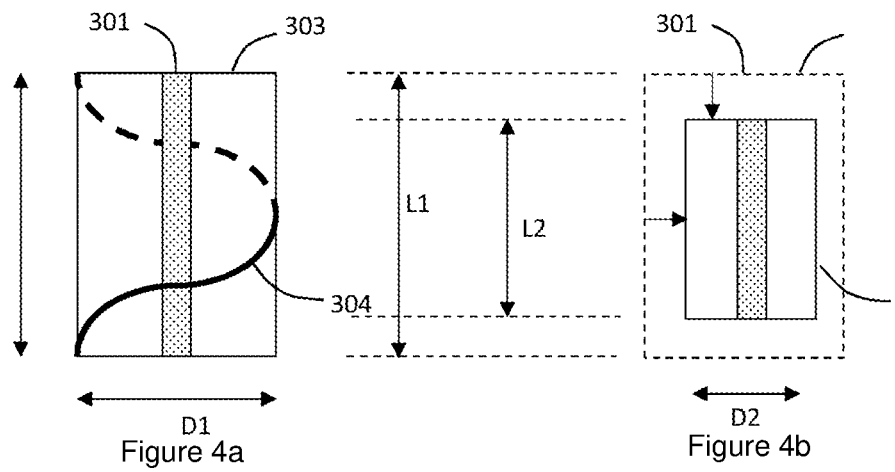
Figure 4a
Figure 4b
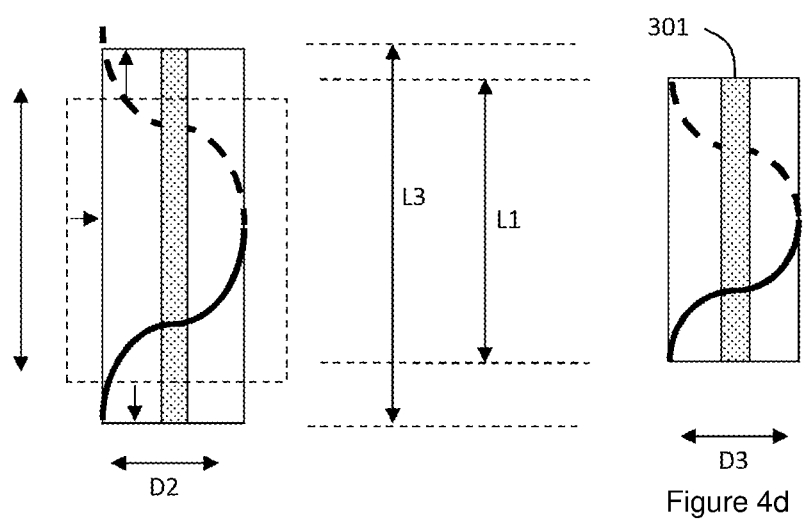
Figure 4c
Figure 4d
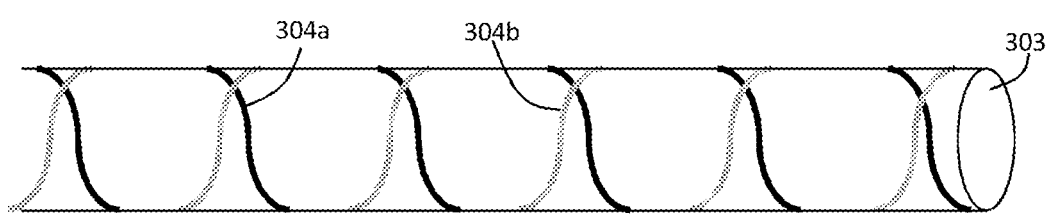
Figure 5a

CABLE FOR DISTRIBUTED SENSING

FIELD OF THE INVENTION

This application relates to fibre optic cables and methods of manufacture thereof that are suitable for use for fibre optic sensing, especially for fibre optic distributed acoustic sensing.

BACKGROUND OF THE INVENTION

Fibre optic distributed acoustic sensing (DAS) is a known type of sensing where an optical fibre is deployed as a sensing fibre and interrogated with electromagnetic radiation to provide sensing of acoustic activity along its length, i.e. dynamic strains acting on the sensing fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, dynamic strains due to incident acoustic waves, cause a variation in the properties of the radiation which is backscattered from that portion. This variation can be detected and analysed and used to give a measure of the intensity of disturbance of the fibre at that sensing portion. Thus the DAS sensor effectively acts as a linear sensing array of acoustic sensing portions of optical fibre.

Such DAS sensors therefore typically perform repeated interrogations of the sensing fibre, where each interrogation involves transmitting at least one pulse of coherent optical radiation into the optical fibre and detecting the intensity of backscattered light from each of a number of sensing portions of the sensing fibre, also called channels, of the DAS sensor. In one type of DAS sensor the intensity of Rayleigh backscatter from a given channel in response to separate interrogations of the sensing fibre is monitored to determine any acoustic stimulus acting on the fibre and in one example each interrogation involves launching a single continuous pulse of coherent interrogating radiation. The backscatter from the fibre will depend on the distribution of the inherent scattering sites within the fibre, which will vary effectively randomly along the length of the fibre. Thus the backscatter intensity from any given interrogating pulse will exhibit a random variation from one sensing portion to the next but, in the absence of any environmental stimulus, the backscatter intensity from any given sensing portion should remain the same for each repeated interrogation (provided the characteristics of the interrogating pulse remains the same). However an environmental stimulus acting on the relevant sensing portion of the fibre will result in an optical path length change for that section of fibre, e.g. through stretching/compression of the relevant section of fibre and/or a refractive index modulation. As the backscatter from the various scattering sites within the sensing portion of fibre will interfere to produce the resulting intensity, a change in optical path length will vary the degree of interference and thus result in a change in backscatter intensity. This change in intensity can be detected and used as an indication of a disturbance acting on the fibre, such as an incident acoustic wave.

In another type of DAS sensor the backscatter signal is processed to determine a phase change. In one example each interrogation involves launching two pulses of coherent radiation of differing optical frequencies into the fibre. This means that the Rayleigh backscatter received at the detector comprises backscatter from both pulses, which will interfere, and thus there will be a signal component at the frequency difference between the pulses. If the two pulses are spatially separated in the fibre then an environmental disturbance acting on the fibre, between portions of the fibre where the pulses are reflected from, can lead to an optical path length change. This in turn will produce a phase change in the signal at this difference frequency, which can be thought of as a signal at a carrier frequency. By an appropriate choice of carrier frequency and processing of the detected signal this phase change can be related to the amplitude of the disturbance acting on the fibre. Again the characteristics of the interrogating radiation, i.e. the frequencies and durations of the two pulses, would typically be the same for each interrogation. Such a phase based DAS system can provide an indication of the actual amount of phase shift caused by an incident stimulus and thus provide a quantitative measure of amplitude of any disturbance.

DAS sensors of the type described above have been usefully proposed for a number of applications such as monitoring of perimeters or borders or linear assets such as pipelines or the like for intruder detection or tampering. For many such applications a DAS sensor using a conventional optical fibre is sufficiently sensitive to detect the events of interest.

Rayleigh backscatter based distributed fibre optic sensors can also be used to detect optical path length changes due to dynamic temperature variations and it has been proposed to use such sensors for monitoring temperature changes. Temperature variations of the fibre optic cable can result in variations of the effective optical path length of the optical fibre, due to dimensional changes and/or variations in refractive index. These thermal induced changes result in a similar variation in measurement signal of a DAS apparatus as would result for a dynamic strain on the optical fibre. Measurements of a disturbance in a sensing fibre optic cable due to physical interference of the cable (e.g. a dynamic strain) and disturbances due to thermal expansion or contraction (e.g. a dynamic temperature variation) are thus indistinguishable from one another in a conventional DAS system. As DAS systems are often implemented with sensing optical fibres deployed over large distances, e.g. of up to 40 km or so, there can be significant temperature change in one portion of the sensing fibre to the next. For DAS sensors where measurement of low frequency strains is of interest such temperature induced variations can represent unwanted erroneous signals, i.e. signal noise.

SUMMARY OF THE INVENTION

Embodiments of the present disclosure relate to fibre optic cables that are useful for distributed acoustic sensing that at least mitigate at least some of the issues noted above.

Thus according to an embodiment of the present invention there is provided a fibre optic cable comprising; at least one optical fibre, and a force transformer mechanically coupled to the at least one optical fibre; wherein the force transformer is configured to transform transverse forces due to dimension changes of the cable arising from a temperature variation of the cable into longitudinal forces to counteract the longitudinal component of said dimension change over a tuned temperature range.

Embodiments of the invention thus provide a fibre optic cable suitable for distributed acoustic sensing that has a relatively low sensitivity to temperature variations, at least over a tuned temperature range, and in some instances which may provide a sensing signal which is insensitive to temperature changes over at least part of the tuned temperature range. If part of the fibre optic cable is subject to a temperature variation, the material of the cable will tend to expand or contract due to the change in temperature. Normally this could result in a change in length of the sensing fibre with a consequent change in optical path length that could be detected by a suitable distributed acoustic sensing interrogator unit. In embodiments of the invention however the forces arising from a change in dimensions of the cable material due to a change in temperature result in a counteractive forces being generated by the force transformer. This can reduce or eliminate the magnitude of any change in optical path length and thus reduce the sensitivity to temperature variations.

In some embodiments the fibre optic cable may comprises a compliant core material mechanically coupled to the at least one optical fibre such that a longitudinal force acting on the compliant core material induces a longitudinal strain in the at least one optical fibre. The compliant core material may have a positive thermal coefficient of expansion. In some embodiments the at least one optical fibre is coupled to a buffer material and the buffer material is coupled to the compliant core material. The force transformer may be coupled to the at least one optical fibre via the compliant core material. For instance the force transformer may be bonded to the compliant core material and/or anchored to the compliant core material at a plurality of anchor points. In some embodiments the force transformer may be at least partly embedded with the compliant core material. The force transformer may be stiffer than the compliant core material. In some embodiments the compliant core material comprises extruded nylon.

In some implementations the stiffness of the force transformer is configured with respect to a thermal coefficient of expansion of the fibre optic cable such that a temperature variation within the tuned temperature range results in a change of effective optical path length of the fibre optic cable of less than or equal to 5%. The stiffness of the force transformer may be configured with respect to a thermal coefficient of expansion of the fibre optic cable such that a temperature variation within the tuned temperature range results in substantially no change of effective optical path length of the fibre optic cable.

The force transformer may comprise a braid member. The force transformer may comprise at least one helically coiled member. The helically coiled member may be coiled around a compliant core member if present. The helix angle of the helically coiled member is of the order of 50 to 70 degrees. The helix angle of the helically coiled member may be greater than 5 degrees. The diameter of the helically coiled member may be in the range of 1 to 10 mm.

At least one portion of the fibre optic cable may comprise a plurality of force transformers, each force transformer comprising a helically wound coiled member. At least one helically wound coiled member may be wound in the opposite direction to another helically wound coiled member. At least one helically wound coiled member may be interleaved with another helically wound coiled member.

The force transformer may comprise a metallic material. The force transformer may comprise a shaped steel member. The volume percentage of steel of the fibre optic cable may be substantially 10%.

The fibre optic cable may comprise a first jacket layer and the at least one optical fibre, and the at least one force transformer may be disposed within the first jacket layer. At least part of the force transformer may be coupled to the first jacket layer. The force transformer and compliant core material may be disposed so as to be moveable with respect the first jacket layer.

In another aspect there is provided a fibre optic cable having a longitudinal axis comprising; at least one optical fibre; and a force transformer mechanically coupled to the at least one optical fibre, such that a transverse force acting on the force transformer induces longitudinal forces in the at least one optical fibre, wherein the force transformer is configured such that, in response to dimension changes of the fibre optic cable transverse to the longitudinal axis due to temperature variations, the force transformer induces counteractive forces on the fibre optic cable along the longitudinal axis, such that variation of an effective optical path length of the at least one optical fibre is substantially reduced.

The invention will now be described by way of example only with respect to the accompanying drawings, of which:

DESCRIPTION OF THE DRAWINGS

FIG. 4a, FIG. 4b, FIG. 4c, and FIG. 4d illustrate the principles of a force transformer for transforming a transverse dimensional changes due to thermal effects into a longitudinal force;

FIGS. 5a and 5b illustrate two further examples of force transformers;

DESCRIPTION OF THE INVENTION

Embodiments of the present disclosure relate to fibre optic cables suitable for use for fibre optic sensing, e.g. distributed acoustic sensing (DAS), having a desired or a tuned thermal response to temperature variations and to the use of such cables.

Figure 1:
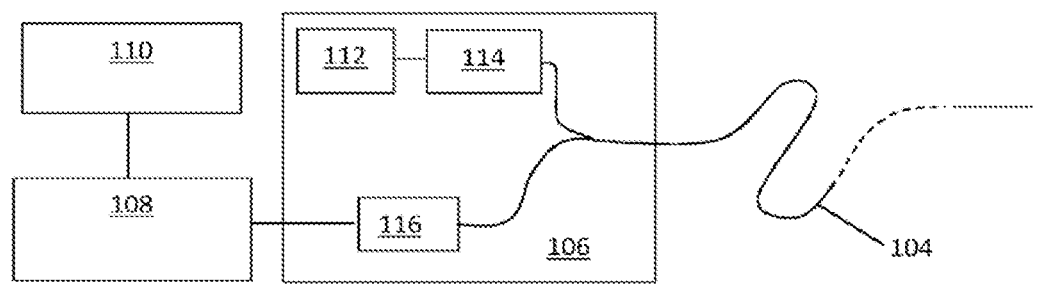
FIG. 1 illustrates a DAS sensor apparatus.

FIG. 1 shows a schematic of a distributed fibre optic sensing arrangement. A length of optical fibre 104 is removably connected at one end to an interrogator 106 and acts as a sensing fibre. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometres in length and can, in some applications be tens of kilometres in length. In conventional DAS the sensing fibre may be a standard, unmodified single mode optic fibre such as is routinely used in telecommunications applications without the need for deliberately introduced reflection sites such a fibre Bragg grating or the like. The fibre will be protected by containing it with a cable structure which may contain more than one optical fibre.

In use the fibre optic cable comprising the sensing fibre 104 is deployed in an area of interest to be monitored. In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 or optical characteristics such as described in WO2012/137022, the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 and WO2012/137022 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulses separated by a known optical frequency difference. The interrogator also comprises at least one photodetector 116 arranged to detect radiation which is Rayleigh backscattered from the intrinsic scattering sites within the fibre 104. A Rayleigh backscatter DAS sensor is very useful but systems based on Brillouin or Raman scattering are also known.

The signal from the photodetector is processed by signal processor 108. The signal processor conveniently demodulates the returned signal based on the frequency difference between the optical pulses. The processor may process the detected backscatter for example as described in any of GB2,442,745, WO2012/137021 or WO2012/137022. The signal processor may also apply a phase unwrap algorithm. The phase of the backscattered light from various sections of the optical fibre can therefore be monitored. As described previously any changes in the effective optical path length within a given section of fibre can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Note that the term acoustic shall be taken to mean any type of pressure wave or mechanical disturbance or varying strain generated on the optical fibre and for the avoidance of doubt the term acoustic will be used in the specification to include seismic signals and waves or other types of vibration. As used in this specification the term "distributed acoustic sensing" will be taken to mean sensing by optically interrogating an optical fibre to provide a plurality of discrete acoustic sensing portions distributed longitudinally along the fibre and the term "distributed acoustic sensor" shall be interpreted accordingly.

Such a sensor may be seen as a fully distributed or intrinsic sensor, as it uses the intrinsic scattering processed inherent in an optical fibre and thus distributes the sensing function throughout the whole of the optical fibre.

Figure 2:
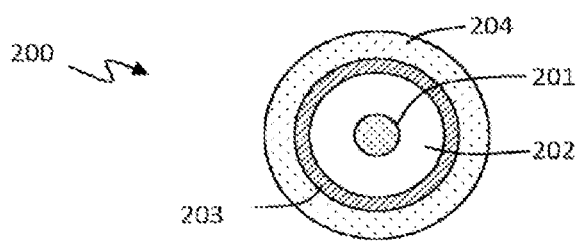
FIG. 2 illustrates a conventional fibre optic cable structure.

FIG. 2 illustrates generally one example of a known type of fibre optic cable 200 that could be used to provide the sensing fibre. FIG. 2 illustrates a cross section through the fibre optic cable. The fibre optic cable 200 comprises least one optical fibre 201, which will typically comprise a core and cladding and possibly a fibre jacket as will be well understood by one skilled in the art. In some applications there may be more than one optical fibre 201. The optical fibre(s) 201 may be located within a buffer material 202 for protection of the optical fibre. In some fibre optic cables the buffer may be a material that is tightly bound to the optical fibre(s) of the cable but other designs are known including gel filled cables where the gel provides the buffer material. In this example the buffer material 203 is surrounded by an armour layer 203. The armour layer 203 may be provided to provide strengthening and protection of the optical fibre(s) 201. In some applications the armour layer may be a metallic layer and may for instance comprise a tube of steel or similar material. In some applications however the cable is desired to have some flexibility and a steel tube would be too inflexible. In such instances the cable may comprise a flexible armour layer such as an aramid layer or braided metallic shield.

The aramid or braided metallic layer will be tightly wound so as to form an effectively continuous armour layer to protect the fibre on all sides and bound to the buffer layer to protect the fibre layer from being overextended if subject to a longitudinal force, e.g. pulling on the cable. An outer jacket material 204 may be provided to give environmental protection, e.g. to make the cable watertight and/or gas impermeable.

One skilled in the art will of course appreciate that there are a variety of fibre optic cable designs and in other designs there may be additional armour layers or there may be no armour at all. In some designs there may be a central strength member such as a metallic rod or wire running along the path of the cable axis. There additionally may be more buffer and/or jacket layers.

A fibre optic cable 200 such as described with respect to FIG. 2 may be usefully employed in many applications for DAS.

However, as mentioned above if the fibre optic cable 200 is used for DAS strain sensing the cable will also produce signals due to temperature variations from expansion/contraction resulting in a physical length variation and/or a variation in refractive index. Typical fibre optic cables have a positive thermal expansion coefficient. For example, in some fibre optic cables as may be used for DAS, a temperature change may result in a change in the backscatter signal of about 100 radians per metre per degrees centigrade. Thus when the temperature of the fibre optic cable decreases the diameter and length of the fibre optic cable will also decrease. The decreasing dimensions of the fibre optic cable results in a change in the effective optical path length of a sensing portion the fibre optic cable, which in turn results in variation in the measurement signal for that sensing portion. Similar detectable changes occur when the temperature of the cable increases and undergoes thermal expansion.

Embodiments of the present disclosure thus relate to fibre optic cables, where the fibre optic cable comprises a force transformer, mechanically coupled to the optical fibre, to substantially reduce any variation in effective optical path length of sensing portions of the optical fibre due to changes in temperature of the relevant sensing portion of the cable. The force transformer achieves this effect by transforming radial or transverse forces arising from dimension changes of the material of the fibre optic cable due to temperature variation, into a longitudinal force. As mentioned above since typical fibre optic cables have a positive thermal expansion coefficient, then decreasing temperature would normally result in contraction of the fibre optic cable, with a resultant decrease in length and diameter as the material of the cable shrinks. In a fibre optic cable comprising an embodiment of the force transformer, as the temperature decreases the diameter of the fibre optic cable will tend to decrease i.e. contract. The force transformer is configured to transform such a radial contraction force into a longitudinal lengthening force. As such the presence of the force transformer results in this radial contraction leading to a force tending to increase i.e. expand, the cable in the longitudinal direction. This longitudinal force at least partly counteracts the longitudinal contraction due to the decrease in temperature and thus reduces the resulting effect on effective optical path length. The opposite effect occurs when the temperature increases and the diameter of the cable expands, i.e. the force transformer results in a force tending to contract the length of the fibre optic cable. In this way the variation of effective optical path length in the cable is substantially reduced when compared to the effects of temperature changes in conventional fibre optic cables.

Thus in some embodiments a fibre optic cable comprises at least one optical fibre with a force transformer mechanically coupled to the optical fibre, such that transverse forces acting on the force transformer due to thermal expansion/contraction of the fibre optic cable induces longitudinal forces that tend to counteract, i.e. act against, the longitudinal thermal expansion/contraction. This can reduce the effective optical path length variation of sensing portions of the optical fibre arising from temperature changes, at least within a first temperature range, and in some embodiments the force transformer may substantially eliminate any change in optical path length over the first temperature range, thus providing a fibre optical cable which is substantially insensitive to temperature variations within the first range.

Note that as used herein the term counteract shall be used to mean to act against or in opposition to the relevant force or dimensional change. In some instances the counteractive force may be substantially equal to the force it opposes, so as to effectively cancel the force. In some instance however the counteractive force may be less than the force it opposes, so as not to completely cancel the force or in some instances the counteractive force may be greater than the force is opposes, so as to result in a small dimension change in the opposite direction.

As mentioned above fibre optic cables can include many layers such as buffer 202 and armour layer 203. In some embodiments the force transformer is mechanically coupled to at least one of these layers. The force transformer is configured to apply a predetermined transfer of force for a given radial dimension change that is tailored to the thermal expansion properties of the materials used in the fibre optic cable.

Figure 3A:
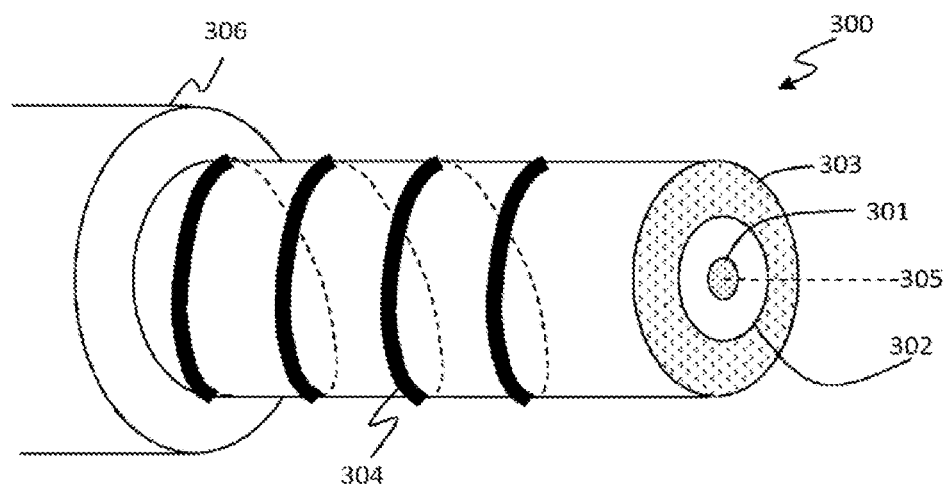
FIGS. 3a and 3b illustrate other examples of fibre optic cable structures according to embodiments.
Figure 3B:
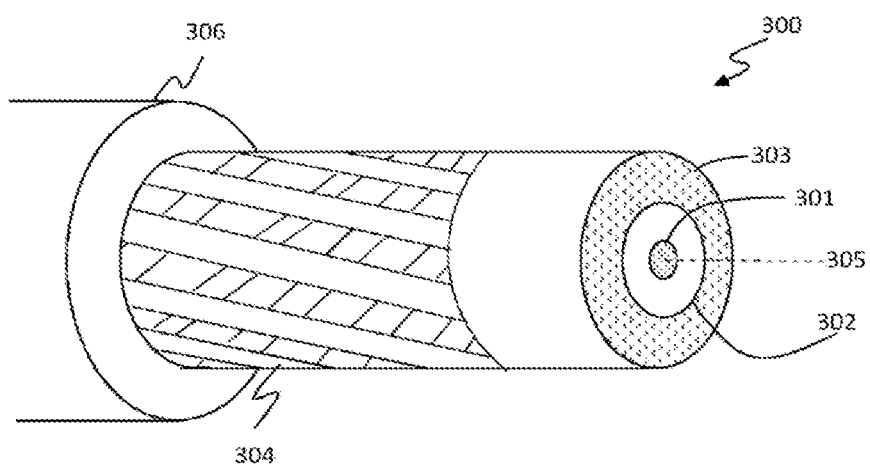

FIGS. 3*a* and 3*b* each illustrate perspective cutaway views of fibre optic cables 300 according to embodiments. In each case, the fibre optic cable comprises at least one optical fibre 301. Only one optical fibre 301 is illustrated in FIGS. 3*a* and 3*b* for clarity but it will be appreciated that the fibre optic cable could comprise a plurality of optical fibres. Each optical fibre 301 may comprise a core and cladding as would be understood by one skilled in the art. The optical fibre may also comprise at least one fibre jacket material.

The optical fibre(s) 301 may be coupled to a tight buffer material 302 which may itself be coupled to a compliant core material 303. The coupling between the optical fibre 301 and the compliant core material 303 is such that a dynamic longitudinal strain applied to the compliant core material will induce a longitudinal strain in the optical fibre. In other words a longitudinal displacement of the compliant core material 303 will result in a longitudinal displacement of any buffer material 302 and correspondingly the optical fibre 301. Thus the optical fibre 301 will not slide significantly within the core material 303 or buffer 302, at least for dynamic strains resulting from pressure waves of the frequencies of interest for DAS. In some embodiments the material 303 of the compliant core may also act as the buffer material 302, i.e. a separate buffer material 302 may not be required.

In some embodiments the buffer material 302 may be a gel or gel-like material. Various gel buffers are known for fibre optic cables. A relatively sudden longitudinal movement of the compliant core material 303 will cause a longitudinal movement in a gel buffer material which will be transmitted to the embedded optical fibre 301. Thus a gel buffer can provide the coupling described above. However, if the fibre optic cable is subject to relatively large and slow, i.e. low frequency strains, such as may be experienced during installation or handling of the fibre optic cable for instance, a gel buffer material may relax the strain experienced by the optical fibre. Thus use of a gel buffer material may help reduce the risk of damage during installation and handling whilst still providing good coupling at the frequencies of interest. Gel buffered fibre optic cables based on a conventional design, i.e. without a force transformer, have been used previously as DAS sensing fibres and have performed well for incident longitudinal waves, showing good coupling between the fibre, gel buffer and outer cable layers at acoustic frequencies of interest.

Mechanically coupled to the compliant core material 303 is at least one force transformer which in these embodiments comprises a braid member 304 wound around the compliant core material 303. The braid member 304 may be coupled to the compliant core material 303 to effectively grip the compliant core material 303 so that the compliant core material 303 moves with the force transformer, i.e. braid 304. In some embodiments however the force transformer may additionally or alternatively be anchored to the compliant core material 303 at various anchor points and/or at least part of the braid member 304 may be embedded within the compliant core material 303. The braid member 304 in these examples is coiled around the longitudinal cable axis 305 in a generally helical fashion and is surrounded by at least one cable jacket material 306.

The braid member 304 has a relative stiffness, compared to the compliant core material 303, and the buffer material 302 if present, which means that the braid member 304 is deformable and, due to the helical winding of the braid member, in response to radial dimension changes due to temperature changes, the braid member deforms to counteract longitudinal dimensional changes, as illustrated in FIG. 4.

FIGS. 4*a-d* illustrate a portion of the fibre optic cable 300 with one complete winding of braid member 304. FIGS. 4*a-d* illustrates the path of the braid member 304 as viewed from a direction which is perpendicular to the longitudinal cable axis, i.e. a transverse direction or radial direction. It can be seen that from such a view the braid member 304 has a shape that is convex with respect to the cable longitudinal axis, i.e. has a shape that bulges or curves outwards from the cable axis in a transverse direction. It will, of course, be understood that if the braid member 304 is coiled around the cable axis then the radial distance of the coil from the cable axis may be substantially constant. However when viewed from a given (fixed) transverse direction the path of the braid member 304 (or at least the projection of the path in a plane parallel to the cable axis) has a generally meandering or serpentine path with respect to the cable axis which defines a convex shape. In yet other words the shape of the force transformer is such that the distance of the force transformer from the cable axis in a first (fixed) transverse direction (e.g. x-axis component of distance) varies along the cable axis (e.g. the z-axis). This means that a transverse force applied to the braid member 304 is at least partly transformed into a longitudinal force which results in a change in the longitudinal length of the force transformer.

FIG. 4a illustrates a section of the fibre optic cable having a force transformer 304. FIG. 4a illustrates the section of fibre optic cable, of a first length L1 and diameter D1, at a first constant, i.e. steady state, temperature T1. As explained above the optical fibre 301 and compliant material 303 collectively have a positive thermal expansion coefficient and therefore expands with an increase in temperature and contracts on a decrease in temperature. FIG. 4b illustrates how the section of fibre optic cable may contract on a decrease in temperature in the absence of the force transformer 304. FIG. 4b represents the situation (in exaggerated fashion) that may result if the temperature of this section of the fibre optic cable, without the force transformer 304, were to reach a new steady state temperature T2 which is lower than T1. It can be seen that the section of fibre optic cable may contract in both length (to L2) and diameter (D2).

FIG. 4c illustrates the effect of the force transformer 304 to a transverse, i.e. radial, compressive force (without any externally applied longitudinal force). The contraction results in the diameter of the cable decreasing, for instance to the diameter D2. Due to the helical shape of the force transformer 304 the decreasing diameter of the cable forces a deformation of the force transformer 304 which tends to increase the cable dimensions in the longitudinal axis i.e. the length of the section expands to L3.

FIG. 4d thus illustrate the effect of a thermal contraction in a fibre optic cable having a force transformer 304. The radial contraction of the compliant material 303 due to thermal effect results in a longitudinal force being exerted by the force transformer that counteracts the longitudinal contraction, with the result the length of the section remains substantially unchanged at L1. In this way variation of effective optical path length of the optical fibre due to thermal effects is substantially reduced and may be substantially eliminated, i.e. the fibre optic cable is temperature compensated, at least for a range of temperatures.

FIGS. 4a-d illustrates a relatively simplistic picture of the various effects and in practice there will be interaction between the force transformer and material of the fibre optic cable that may also act to reduce the dimension changes and the various forces may tend to balance and cancel to at least some effect so as to reduce the variation in effective optical path length.

It should be noted that in practice there may be a change in refractive index due to temperature variation and so the physical length of the section of the fibre optic cable may vary slightly with temperature, but with no substantial change in optical path length. The physical length change with temperature is typically the dominant effect on optical path length however.

It will be appreciated that a fibre optic cable 300 incorporating a force transformer will not necessarily be temperature compensated for all temperatures. The properties of the braid member 304 and compliant core material will determine the range of temperatures for which the cable is compensated, i.e. the range of temperatures within which any variation in temperature does not substantially alter the effective optical path length. Particularly the stiffness of the braid member will determine the range of temperatures for which cable is compensated. The stiffness of the braid member relates to the materials the braid is made from, but also the shape and structure of the braid member. In some embodiments the braid can take on a helical winding configuration. Therefore the helical winding and helix angle will contribute to the stiffness of the braid member and thus the range of temperatures the cable is insensitive for. DAS systems are employed in a wide variety of environments, with different temperature ranges. It will therefore be appreciated that a specific stiffness of force transformer will result in a cable which is compensated for a specified range of temperatures, suitable for a specific environment and varying the stiffness may vary the specified range of temperature.

The cable should ideally be stiff enough to install without too much stretch. In some embodiments the compliant core material may not be a continuous homogenous material but may have cavities or other internal features so that the bulk stiffness can be tailored for the relevant application and the thermal expansion coefficient of the fibre optic cable. For example the compliant core material could be an extruded shape with holes and/or spokes. The core material should also be rigid enough not to collapse too much under any steady state pressure of the surrounding medium when deployed.

The helix angle of the force transformer should be arranged to provide a desired mechanical advantage for the force transformer but also chosen to provide a significant longitudinal force on the compliant core for radial dimension change due to temperature variations. The closer the helix angle gets to 90 degrees, the greater the longitudinal stiffness will be. In some embodiments the helix angle may be greater than about 5 degrees. In one embodiment the helix angle may be of the order of substantially 60 degrees, say in the range of 50-70 degrees. Note that as used herein the term helix angle refers to the angle that the helical structure makes to a circumferential line.

The diameter of the force transformer may be relatively low, thus permitting the overall diameter of the cable structure to be relatively low. For example the diameter of the force transformer may be of the order of 5 to 10 mm. In some instances the overall diameter of the cable may be of the order of 6 to 10 mm. If required however smaller diameter cables could be constructed using smaller diameter force transformers and smaller diameter compliant cores, for instance a cable diameter of down to about 1 mm has been fabricated. In some applications however (e.g. for hydrophones), a larger diameter cable structure may be advantageous and it may be wished to use a larger diameter force transformer structure.

The braid member 304 of the force transformer may conveniently comprise a metallic material, for example steel. As mentioned the braid member could be stiffer than the compliant core and optical fibre and yet still be deformable to transverse forces due to temperature variations. Steel can provide the required properties and can be worked to form a coiled structure relatively easily during cable manufacture. Stainless steel is stiff, corrosion resistant, readily available and reasonably cheap and has already been used in cable manufacture for different reasons. However other materials such as glass fibre or carbon fibre could potentially be used in some cable designs and possibly superelastic materials such as Nitinol. In some embodiments the braid member may be formed from an alloy comprising materials with different properties. The materials and their proportions may be chosen to tailor the overall response of the force transformer at different temperature ranges, for instance to tailor the range of temperatures for which the cable may be insensitive to temperature variations.

The compliant core material should be suitably compliant so as to move with the force transformer but should also be suitable for transferring an induced strain to the optical fibre or buffer material. One suitable compliant core material may be extruded nylon which is used in some fibre optic cable construction already. As mentioned above the compliant core material should be have sufficient stiffness for the required application and may in some instance have a non-homogeneous structure. In some embodiments for instance a closed cell foam material could be used and for example the pore fraction could be controlled to tune the stiffness for the required application. Other polymer materials could also be used.

Manufacture of a fibre optic cable according to the present invention may therefore involve initially producing one or more optical fibres in a tight buffered configuration in a core material such as extruded nylon using various conventional fabrication techniques before winding a suitable material such as a steel wire around the core material using known winding techniques. The core material with surrounding helically coiled member may then be encapsulated in one or more outer jacket materials using known manufacturing techniques. As mentioned above the outer jacket is arranged to apply any external pressure to the coiled member, but to substantially avoid applying pressure directly to the compliant core. The overall cable structure should preferably be stiff enough to install without too much stretch of the cable, which could potentially result in damage to the optical fibre(s). In some embodiments a strength member may be incorporated in the fibre optic cable to limit the overall extent of longitudinal extension of the fibre to prevent damage to the cable, and in particular to the optical fibre, during handling and installation where relatively high longitudinal forces may be experienced. Additionally or alternatively a pull cord or other apparatus for limiting the extension of the cable may be attached to or formed within the cable structure.

In practice the various material properties may be chosen for a particular application and/or for compatibility of with other components of the cable structure. As discussed above the force transformer may, in some instances, be formed, at least partly, from steel. Steel has a much higher stiffness than the conventional polymers used for the fibre optic cable, and is typically approximately 100 times stiffer than such conventional polymers. This means that a relatively small proportion of steel would be required to be the dominant stiffness in the cable structure, depending on the form, e.g. the helix angle, of the force transformer. The thermal expansion coefficient of the conventional polymers is greater than that of steel, say of the order of 8 times greater. Hence, to produce a suitable temperature compensated cable comprising a braid member, the cable volume composition may only comprise a relatively low percentage of steel. The natural stiffness of steel combined with the appropriate helix angle of the braid member can produce a temperature compensated cable with a relatively low percentage volume of steel. In an embodiment a fibre optic cable comprising a steel braid member may comprise steel, in proportion to the cable polymers, in proportion of about 10% by volume.

It will be understood that optical fibres wound with metallic material have been proposed previously. For instance, as noted above metallic braiding has previously been used for armouring in conventional fibre optic cables. In such cables however the braiding has been tightly wound and tightly interwoven and, as such, is not configured to be deformable together with a compliant core so as to translate a radial deformation due to temperature variations into a longitudinal deformation. In conventional fibre optic cables any such braiding is configured to have limited deformation and provides no mechanical advantage and does not function as a force transformer.

Figure 5B:
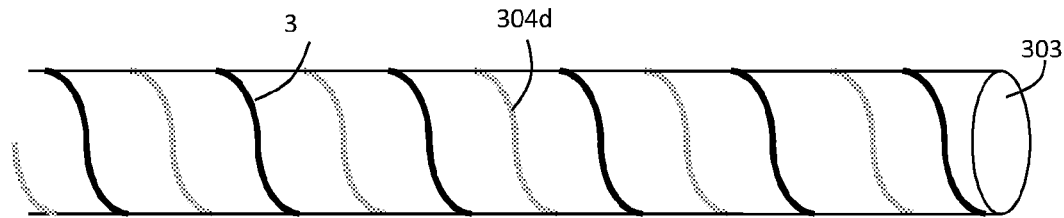

FIG. 3a illustrates a single coiled member 304 wound in a continuous helix. It will be understood however that various other arrangements may be used. For example there may be different helical members at different parts of the fibre optic cable. It may not be possible to provide one single continuous helical coiled member for the entire length of the fibre optic cable and thus different lengths of the optical fibre may be provided with different coiled helical members. In some embodiments a given length of fibre optic cable may have more than one force transformer, e.g. more than one helical coiled member. For example, as illustrated in FIG. 5a, at least one helical coiled member 304a may be provided for a given length of cable winding in one direction, e.g. clockwise, and another helical coiled member 304b may be provided for the same length of fibre winding in the opposite direction, e.g. anti-clockwise. FIG. 3b also shows the braid member 304 is one of multiple windings. An example of this interleaving of helical coiled members 3 and 304d can be seen in FIG. 5b.

Additionally or alternatively one helical coiled member 304c may be interleaved with another helical coiled member 304d with winding in the same sense. As mentioned above the helix winding angle may be chosen to provide a cable with a desired range of compensated temperatures. This will therefore define the helix pitch for a given diameter of compliant core material 303. In some instance providing more than one helical winding may help ensure that localised radial dimension changes due to thermal effects are at least partly transformed to a longitudinal length change. For example if the diameter, D, of the helical structure is of the order of 8 mm, and the helix angle, a, is of the order of 10° then the helix pitch is about 4.4 mm (based on pitch=π·D tan (a)). It may be wished to have elements of the force transformer along one side of the compliant core at a spacing less than 4.4 mm and thus two or more helical structures may be interwound.

Figure 6:
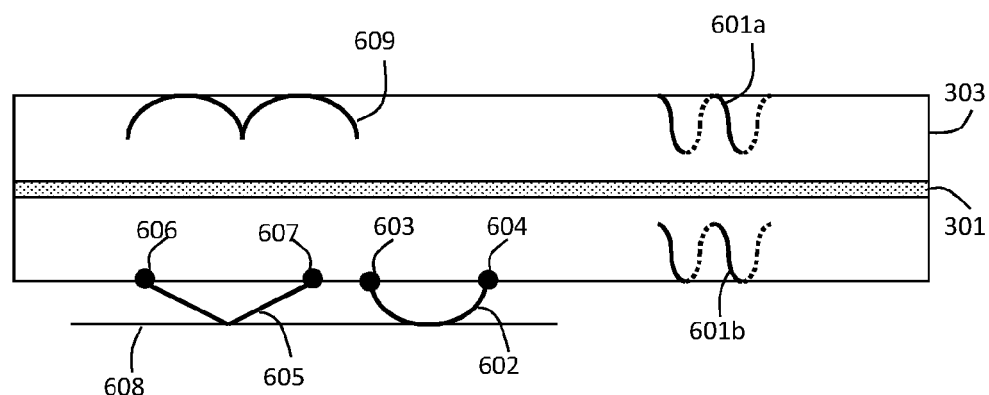
FIG. 6 illustrates other types of possible force transformer.

A helically wound force transformer wound around the outside of a compliant core material has the advantages described above and can be manufactured relatively easily. However there are other designs of force transformers that could be used in some embodiments. FIG. 6 illustrates some examples.

In some embodiments one or more helical force transformers may be used that do not encircle the compliant core material 303 or even the optical fibre(s) 301. For example a helical force transformer 601a may be wound helically with respect to an axis parallel to the cable axis but arranged to one side of the optical fibre 301, for instance embedded within compliant core material 303. At least one other similar helical force transformer 601b could be arranged on the other side of the optical fibre(s) to provide an even transformation on both side of the optical fibre(s).

In some embodiments one or more force transformers with convex shapes could be anchored to the exterior of the compliant core material. For instance force transformer 602 is anchored to the compliant core material at points 603 and 604 which are longitudinally separated from one another and comprises a generally curved element extending between the anchor points, such that the overall length of the force transformer is greater than longitudinal separation. An inward radial force due to temperature variations will tend to deform the force transformer forcing the anchoring point apart. Force transformer 605 is similar and is anchored at point 606 and 607 but comprises two generally straight rods that may for example be joined at a pivot point. The exterior of the compliant core may be surrounded by several such force transformers so as to respond to radial dimension changes due to thermal effects and the force transformers may be coupled to a force plate for even force distribution. Force transformer 609 is somewhat similar but embedded within the compliant core material 302.

Figure 7A:
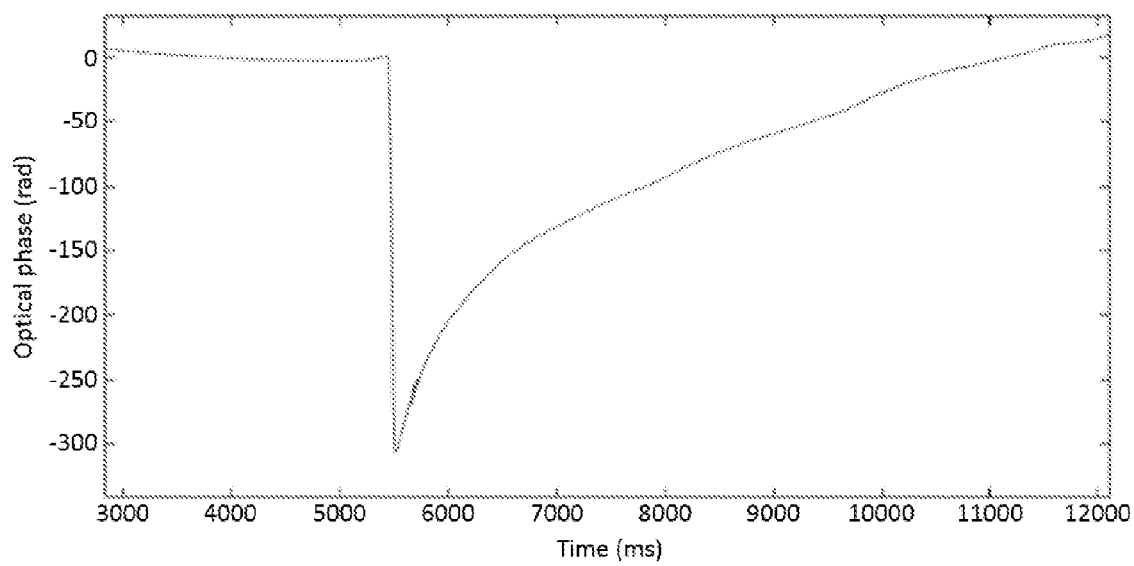
FIGS. 7a and 7b illustrates some test results using a conventional fibre optic cable and a cable according to an embodiment.
Figure 7B:
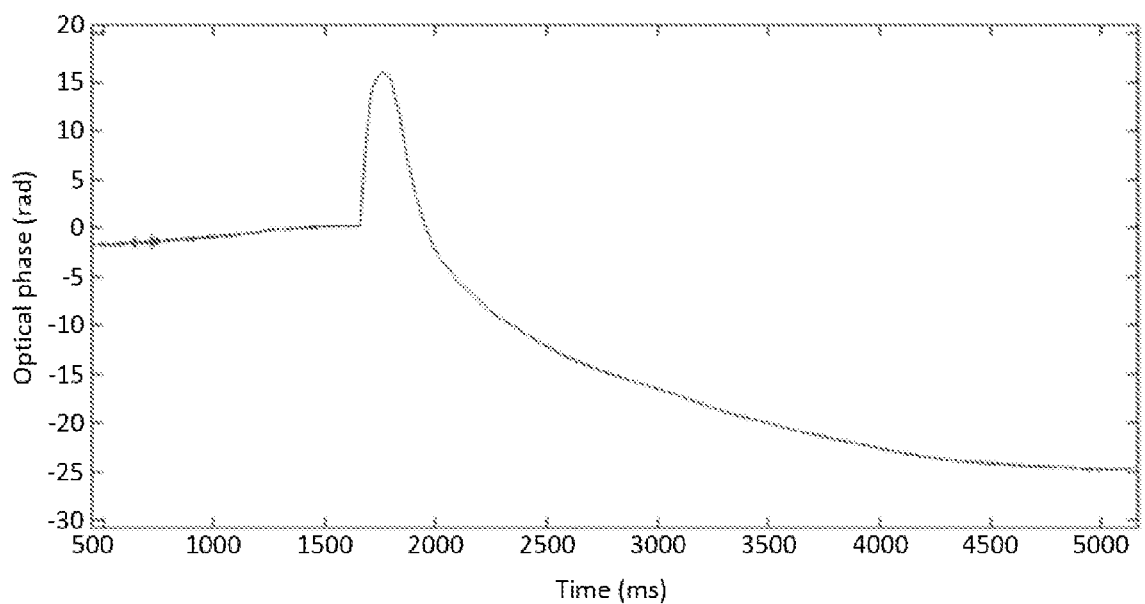

To demonstrate the effect of the force transformer in reducing thermal expansion effects on the effective optical path length experimentation was performed. FIG. 7a and FIG. 7b show graphs of optical phase of a measurement signal obtained from a DAS sensing fibre against time. FIG. 7a shows the results when a conventional fibre optic cable, i.e. without a force transformer, was subjected to the application of coolant, in this case freeze spray, for about 300 milliseconds. With reference to FIG. 7a at approximately 5500 milliseconds the coolant was applied. As can be seen a sharp decrease in optical phase occurs of about 310 radians. This decrease in optical phase arises from a decrease in optical path length resulting from the diameter and length of the fibre optic cable decreasing due to thermal contraction. The effective optical phase then increases back to the original value as the temperature of the cable increases back to ambient temperature and it expands due to thermal expansion.

In contrast FIG. 7b shows the results when a cable according to an embodiment and comprising a force transformer was subjected to the application of the coolant, i.e. freeze spray, at approximately 1800 milliseconds. In this case the optical phase of measurement signal from the cable increased, but only by about 17 radians. This shows a significantly reduced change in optical phase by about 95% when compared to the conventional fibre optic cable. This reduced change in optical phase is due to the effect of the force transformer. As the diameter of the cable contracts due to the decreasing temperature, the force transformer produces a counteractive effect of expanding the length of the cable, thereby greatly reducing the change in effective optical path length.

It can be seen in FIG. 7b that at approximately 2000 milliseconds the optical phase returns to its initial value, however it then continues to decrease showing a negative optical phase. This is due to the gel buffer within the cable that was tested. The application of the freeze spray to the outer part of the cable causes a relatively sudden contractive force, which through the action of the strain transformer is counteracted and actually results in some longitudinal expansion on a short timescale which affects the optical fibre. The optical fibre of the cable then relaxes within the gel after the initial application of the freeze spray bringing the optical phase back to its initial value. Subsequently, over time, the internal heat of the cable diffuses towards the colder outer surface of the cable. This diffusion of heat reduces the temperature of the optical fibre and causes the optical fibre to contract, thereby reducing the effective optical path length creating a negative optical phase. The optical phase reduces to a minimum value of approximately −25 radians.

The gel buffer tends to provide a kind of high pass filtering effect for dynamic length changes imparted from the outer cable structure to the optical fibre. Thus the application of the freeze spray, causing a sudden length change, would be experienced by the optical fibre in both the cable without a strain transformer tested for the FIG. 7a and the cable with a strain transformer tested for FIG. 7b, but the presence of the strain transformer greatly reduces the effect. Subsequently, for the slower thermal equalisation within the cable the presence of the gel tends to reduce the effect of the strain transformer and outer cable on the optical fibre, which mean that in the FIG. 7b example (where the initial change in phase was much reduced) the subsequent contraction of the optical fibre as it itself cools is only partly offset by changes in the outer cable and thus there is a noticeable change in phase which results in the optical phase going negative. Overall however the path length change is much lower in either direction than in the FIG. 7a example. It will of course be understood that the gel buffer could be eliminated in some cable designs to reduce or eliminate this effect or a gel with better low frequency coupling could be used.

FIG. 7b shows clear evidence that a fibre optic cable with a suitable force transformer can provide greatly reduced variation in effective optical path length due to thermal effects.

It will be appreciated that an embodiment of a fibre optic cable comprising a force transformer disclosed in this application may, in some instance, not completely negate any variation of the effective optical path length. As mentioned as the cable changes temperature the refractive index of the optical fibre also changes, thereby altering the effective optical path length and in some instances it may not be possible to exactly cancel both of these effects. However any changes in effective optical path can be substantially reduced compared to a conventional optical fibre without a force transformer. Embodiments of the force transformer disclosed provide a fibre optic cable where effects on the effective optical path length from dimension changes due to thermal effects are substantially reduced.

Fibre optic cables that are substantially insensitive to thermal effects offer various advantages. Cables of this kind could be usefully employed in a number of DAS applications, in particular where the environment surrounding the cable may be expected to undergo relatively significant or frequent changes in temperature. Use of such a cable may avoid any problem with unwanted temperature effects being erroneously mistaken for or masking strain signals of interest, especially low frequency strains.

One application that would benefit would be measuring sea wave height by pressure change, with the effect of sea temperature removed. Another example would be fibre optic cables mounted on fences and perimeters as such cables would undergo virtually no thermal disturbance from temperature changes to the fence and surrounding environment. Another example would be understanding the origin of down hole signals, e.g. in oil or gas wells or observation boreholes etc. There are a vast number of DAS applications that would benefit from a cable that does not produce signals from dimension variations due to thermal effects.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A fibre optic cable comprising;
    at least one optical fibre, and
    a force transformer mechanically coupled to the at least one optical fibre;
    wherein the force transformer is configured to transform transverse forces due to dimension changes of the cable arising from a temperature variation of the cable into longitudinal forces to counteract a longitudinal component of said dimension change over a tuned temperature range, where the stiffness of the force transformer is configured with respect to a thermal coefficient of expansion of the fibre optic cable such that a temperature variation within the tuned temperature range results in a change of effective optical path length of the at least one optical fibre of the fibre optic cable of less than or equal to 5%.

2. The fibre optic cable as claimed in claim 1 wherein the fibre optic cable comprises a compliant core material mechanically coupled to the at least one optical fibre such that a longitudinal force acting on the compliant core material induces a longitudinal strain in the at least one optical fibre.

3. The fibre optic cable as claimed in claim 2 wherein the compliant core material has a positive thermal coefficient of expansion.

4. The fibre optic cable as claimed in claim 2 wherein the at least one optical fibre is coupled to a buffer material and the buffer material is coupled to the compliant core material.

5. The fibre optic cable as claimed in claim 2 where the force transformer is coupled to the at least one optical fibre via the compliant core material.

6. The fibre optic cable as claimed in claim 2 wherein the force transformer is anchored to the compliant core material at a plurality of anchor points.

7. The fibre optic cable as claimed in claim 2 wherein the force transformer is at least partly embedded with the compliant core material.

8. The fibre optic cable as claimed in claim 2 wherein the force transformer is stiffer than the compliant core material.

9. The fibre optic cable as claimed in claim 2 wherein the compliant core material comprises extruded nylon.

10. The fibre optic cable as claimed in claim 1 where the stiffness of the force transformer is configured with respect to a thermal coefficient of expansion of the fibre optic cable such that a temperature variation within the tuned temperature range results in substantially no change of effective optical path length of the fibre optic cable.

11. The fibre optic cable as claimed in claim 1 where the force transformer comprises a braid member.

12. The fibre optic cable as claimed in claim 1 where the force transformer comprises at least one helically coiled member.

13. The fibre optic cable as claimed in claim 12 wherein the helix angle of said helically coiled member is of the order of 50 to 70 degrees.

14. The fibre optic cable as claimed in claim 12 wherein at least one portion of the fibre optic cable comprises a plurality of force transformers, each force transformer comprising a helically wound coiled member.

15. The fibre optic cable as claimed in claim 14 wherein at least one helically wound coiled member is wound in the opposite direction to another helically wound coiled member.

16. The fibre optic cable as claimed in claim 14 wherein at least one helically wound coiled member is interleaved with another helically wound coiled member.

17. The fibre optic cable as claimed in claim 1 wherein the force transformer comprises a shaped steel member.

18. The fibre optic cable as claimed in claim 17 wherein the volume percentage of steel of the fibre optic cable is substantially 10%.

19. A fibre optic cable having a longitudinal axis comprising;
   at least one optical fibre; and
   a force transformer mechanically coupled to the at least one optical fibre, such that a transverse force acting on the force transformer induces longitudinal forces in the at least one optical fibre,
   wherein the force transformer is configured such that, in response to dimension changes of the fibre optic cable transverse to the longitudinal axis due to temperature variations, the force transformer induces counteractive forces on the fibre optic cable along the longitudinal axis, such that variation of an effective optical path length of the at least one optical fibre of the fibre optic cable is less than or equal to 5%.

* * * * *